United States Patent
Takatsuji et al.

(10) Patent No.: US 6,359,741 B1
(45) Date of Patent: Mar. 19, 2002

(54) ADJUSTING DEVICE FOR ATTITUDE AND POSITION OF OPTICAL ELEMENTS

(75) Inventors: Toshiyuki Takatsuji; Sonko Osawa; Tomizo Kurosawa; Hironori Noguchi, all of Tsukuba (JP)

(73) Assignee: Agency of Industrial Science and Technology, Tokyo (JP)

( * ) Notice: Subject to any disclaimer, the term of this patent is extended or adjusted under 35 U.S.C. 154(b) by 0 days.

(21) Appl. No.: 09/613,351

(22) Filed: Apr. 5, 2001

(30) Foreign Application Priority Data

Jul. 15, 1999 (JP) .......................................... 11-201287

(51) Int. Cl.[7] ............................................... G02B 7/02
(52) U.S. Cl. ...................................... 359/827; 359/822
(58) Field of Search ................................. 359/694, 700, 359/813, 822, 827, 703, 704

(56) References Cited

U.S. PATENT DOCUMENTS 3,989,358 A * 11/1976 Melmoth .................... 359/813
6,064,827 A * 5/2000 Toyoda ......................... 396/55

* cited by examiner

Primary Examiner—Ricky Mack
(74) Attorney, Agent, or Firm—Martin A. Farber

(57) ABSTRACT

While the three angles of a plate supporting an optical element, including rolling, pitching and yawing angles, are adjusted, the height of an upper plate of a conventional adjusting device changes. In order to solve this problem, small balls of adjusting screws engaged with a middle plate are made to be abut on three V-shaped concave plates formed on an upper plate, and a spring is extended between spring hooks of the upper plate and middle plate to make the upper and middle plate be forced near each other. By rotating the three adjusting screws, the three angles of the upper plate can be adjusted, and the distance between the upper surface of the upper plate and the lower surface of the lower plate can be adjusted. The middle plate is rotatively supported by the lower plate, and by rotating the projecting shaft of the middle plate, the optical element can be rotated about its optical axis.

2 Claims, 2 Drawing Sheets

ADJUSTING DEVICE FOR ATTITUDE AND POSITION OF OPTICAL ELEMENTS

FIELD AND BACKGROUND OF THE INVENTION

1. Field of the Invention

The present invention relates to a device for adjusting the attitude and position of an optical element such as a plane mirror, a plane beam splitter, and a prism.

2. Description of the Background Art

An optical apparatus uses various types of optical elements such as plane mirrors, plane beam splitters, prisms, cubic beam splitters, cube corners, lenses and wavelength plates. It is necessary to adjust the position of such an optical element to be mounted on an optical apparatus and set its optical axis to a predetermined direction. To this end, a device for adjusting the attitude and position of an optical element is mounted on the optical apparatus. Various devices for adjusting the attitude and position of an optical element are known. Of these, a typical device is shown in FIGS. 2.

FIG. 2A is a plan view of the adjusting device and FIG. 2B is a right side view thereof. In the device shown in FIGS. 2, in order to allow an upper plate 30 to roll, pitch and yaw, the upper plate 30 is made rotatable about a tubular rod 32 inserted in opposing V-grooves 31. The distal end of the upper plate 30 is pushed by an adjusting screw 33 meshed with the upper plate 30 to thereby rotate the upper plate 30 about the tubular rod 32. Forces exerted by right and left two extension springs 34 are applied to a middle area between the rotation center and pushing point. Therefore, the opposing V-grooves 31, tubular rod 32, adjusting screw 33 and a middle plate 35 are made in contact with each other. By rotating the adjusting screw 33, the attitude of the upper plate 30 relative to the middle plate 35 is made adjustable.

With a similar structure described above, the attitude of the middle plate 35 relative to a lower plate 37 is made adjustable. In this case, other opposing V-grooves 38 are formed along a direction perpendicular to the opposing V grooves 31 for the upper plate 30. A rotary shaft 39 is fixed to the bottom surface of the lower plate 37 and rotatively fitted in an unrepresented hole formed in the base of an optical apparatus on which the adjusting device is mounted. In this manner, this adjusting device can adjust the position and attitude of an optical element, including yawing, pitching and rolling, and maintain and fix a desired attitude.

Problem to be Solved

With this adjusting device according to conventional techniques, however, when the three angles for yawing, pitching and rolling are adjusted, a height of the upper plate 30 changes so that this height is required to be adjusted by using another means.

SUMMARY OF THE INVENTION

It is an object of the invention to provide a device of adjusting the attitude and position of an optical element, capable of adjusting the rolling, pitching and yawing angles of an upper plate serving as a mount plate for the optical element, and after this adjustment, reliably fixing the upper plate with six points constraint and adjusting the distance L from the reference plane on which the device is mounted to the upper surface of the upper plate.

Means of Solution to the Problem

In order to solve the above-described problem, the invention provides a device for adjusting the attitude and position of an optical element, comprising: an upper plate having an optical element fixing part formed on an upper surface side of the upper plate and three V-grooves formed on a lower surface side of the upper plate at an equal angular pitch; an adjusting screw mount plate having three female screw portions formed at an equal angular pitch on an upper surface side of the adjusting screw mount plate opposing the lower surface side of the upper plate and a spring engaging part formed in a central area of the adjusting screw mount plate; three adjusting screws each having a ball at a top of the adjusting screw for abutting on a corresponding one of the V-groove and a male screw portion to be threaded with a corresponding one of the female screw portions of the adjusting screw mount plate; and a spring to be extended between a spring hook formed on the upper plate in a central area and a spring hook formed on the adjusting screw mount plate. The adjusting screw mount plate is rotatively mounted on a fixed member.

DETAILED DESCRIPTION OF THE PREFERRED EMBODIMENT

An embodiment of the invention will be described with reference to FIGS. 1A and 1B. FIG. 1A is a plan view of a device for adjusting the attitude and position of an optical element according to an embodiment of the invention, and FIG. 1B is a cross sectional view of the device. In FIGS. 1A and 1B, a plurality of screw holes 3 are formed in an upper plate 1 on its upper surface 2 side. These holes 3 are used for fixing a frame on which an optical element such as a plane mirror, a beam splitter and a wavelength plate is mounted. Three V-shaped concave planes 5 are formed in the upper plate 1 on its lower surface 4 side, at an equal angular pitch of 120° along a direction from the outer periphery to the center of the upper plate 1.

A male screw 7 of an adjusting screw 6 is engaged with a female screw 10 formed in a middle plate 8. The rotary ring 11 has a corrugated surface on its circumferential side wall. As this rotary ring 11 is manually rotated, the adjusting screw 6 can move along its axial direction. Three adjusting screws 6 are mounted at an equal angular pitch of 120° corresponding to the positions of the V-shaped concave plates 5. The small ball 12 is fixed to the top of the adjusting screen 6 and fitted in the V-shaped concave plate 5. The small balls 12 of the adjusting screws 6 support the three V-shaped concave plates 5.

A spring hook 13 is formed on the upper plate 1 at its central area, and another spring hook 15 is formed in a central cylindrical portion 14 of the middle plate 8. Between these spring hooks 13 and 15, a spring 16 is extended. Therefore, the V-shaped concave plate 5 of the upper plate 1 and the small ball 12 are made always in pressure contact with each other, and at the same time, the adjusting screw 6 is prevented from any backlash at its threading portion.

As described above, since each small ball 12 is pushed against the V-shaped concave plate 5, the small ball contacts this plate 5 at two points. Therefore, the upper plate 1 can be constrained by six points of the three V-shaped concave planes. The six degree of freedoms in the space can be reliably fixed.

A lower plate 19 has a central hole 17 into which the outer diameter surface of the central cylindrical portion 14 of the middle plate 8 is fitted. The lower plate 19 rotatively supports the middle plate 8. A fixing screw 18 for fixing the middle plate 8 to the lower plate 19 passes through a laterally elongated hole 20 formed through the middle plate 8. After the middle plate 8 is rotated to a desired position by rotating a projecting shaft 21 mounted on the circumferential side wall of the middle plate 8 with fingers or the like, the middle plate 8 can be fixed to the lower plate 19 at this position by using the fixing screw 18. Screws 22 are formed on the lower plate 19 to fix the adjusting device to an optical apparatus.

In operation of the adjusting device structured as above, an optical element is fixed to the upper surface of the upper plate 1 by using the screw holes 3, and the lower plate 19 is fixed to an optical apparatus by using the screw 22. Thereafter, any of the three adjusting screws 6 is rotated to adjust the attitude of the optical element to thereby adjust the rolling, pitching and yawing angles. By rotating all the three screws by the same amount, the distance L from the upper plate to the optical apparatus can be adjusted without changing the attitude once set. Therefore, even if this distance L is changed while the attitude of the optical element is adjusted, the original distance L can be recovered. Without adjusting the attitude, the distance L only may be adjusted.

By rotating the projecting shaft 21 with fingers or the like, the middle plate 8 can be rotated in the space of the laterally elongated hole 20. Accordingly, the upper plate supported by the middle plate and the optical element fixed to the upper plate can be rotated about the optical axis of the optical element. After this adjustment, the middle plate is fixed to the lower plate by using the screw 18.

Effect of the Invention

As described so far, a device for adjusting the attitude and position of an optical element, comprises: an upper plate having an optical element fixing part formed on an upper surface side of the upper plate and three V-grooves formed on a lower surface side of the upper plate at an equal angular pitch; an adjusting screw mount plate having three female screw portions formed at an equal angular pitch on an upper surface side of the adjusting screw mount plate opposing the lower surface side of the upper plate and a spring engaging part formed in a central area of the adjusting screw mount plate; three adjusting screws each having a ball at a top of the adjusting screw for abutting on a corresponding one of the V-groove and a male screw portion to be threaded with a corresponding one of the female screw portions of the adjusting screw mount plate; and a spring to be extended between a spring hook formed on the upper plate in a central area and a spring hook formed on the adjusting screw mount plate. Accordingly, the attitude of the upper plate serving as a mount plate for an optical element, including the rolling, pitching and yawing angles, can be adjusted and the upper plate can be reliably constrained at six points. The distance L from the upper surface of the upper plate to the reference surface on which the adjusting device is mounted can also be adjusted and a change in the distance L to be caused during the attitude adjustment can be rearranged. The optical element can be set to a desired distance L.

The adjusting screw mount plate is rotatively mounted on a fixed member. Accordingly, in addition to the advantageous effects described above, an angle of the optical element about its optical axis can be adjusted.

EXPLANATION OF THE REFERENCE NUMERALS AND SIGNS

Figure 1:
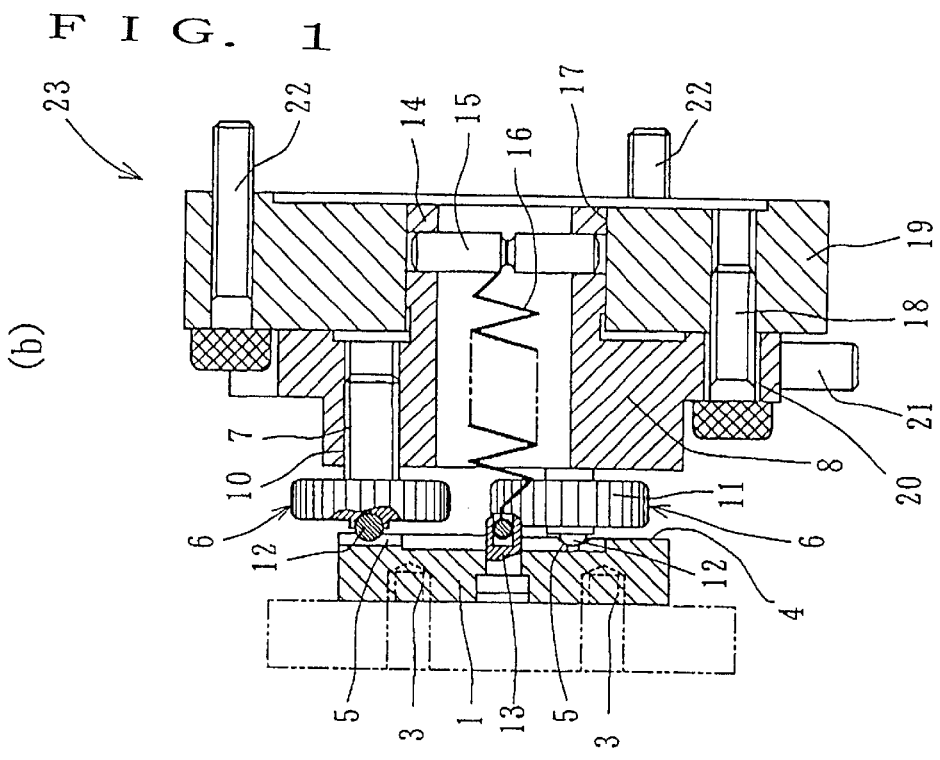
FIGS. 1A is a plan view of a device for adjusting the attitude and position of an optical element according to an embodiment of the invention.
FIG. 1B is a cross sectional view of the device.
Figure 1:
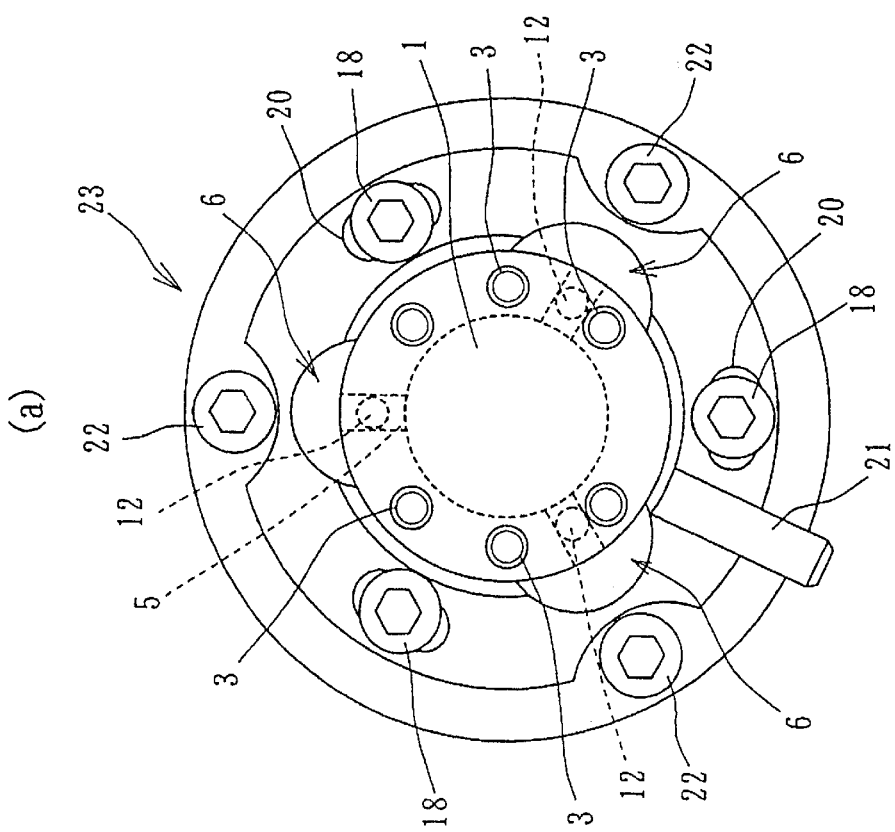
Figure 2:
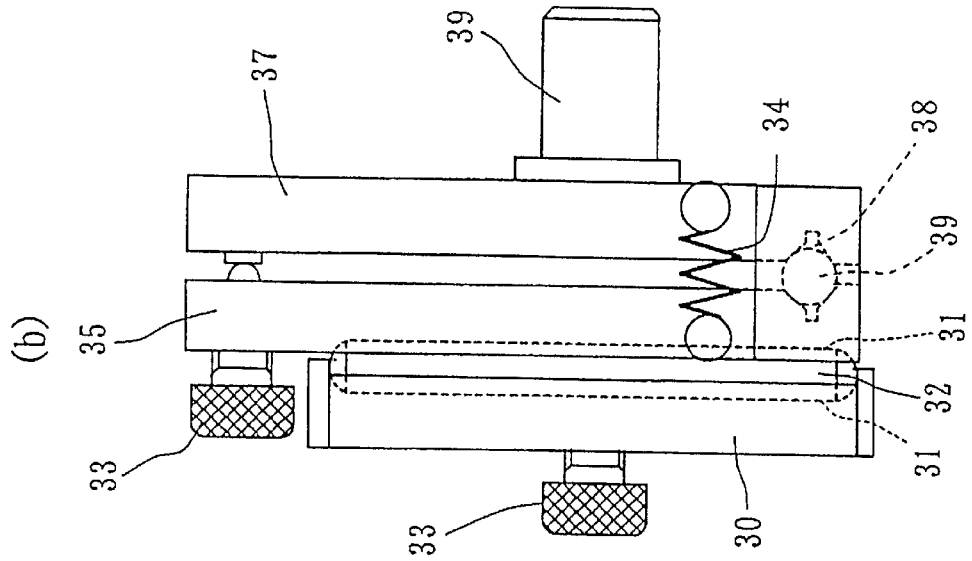
FIGS. 2A is a plan view of a device for adjusting the attitude and position of an optical element according to conventional techniques.
FIG. 2B is a right side view of the device.
Figure 2:
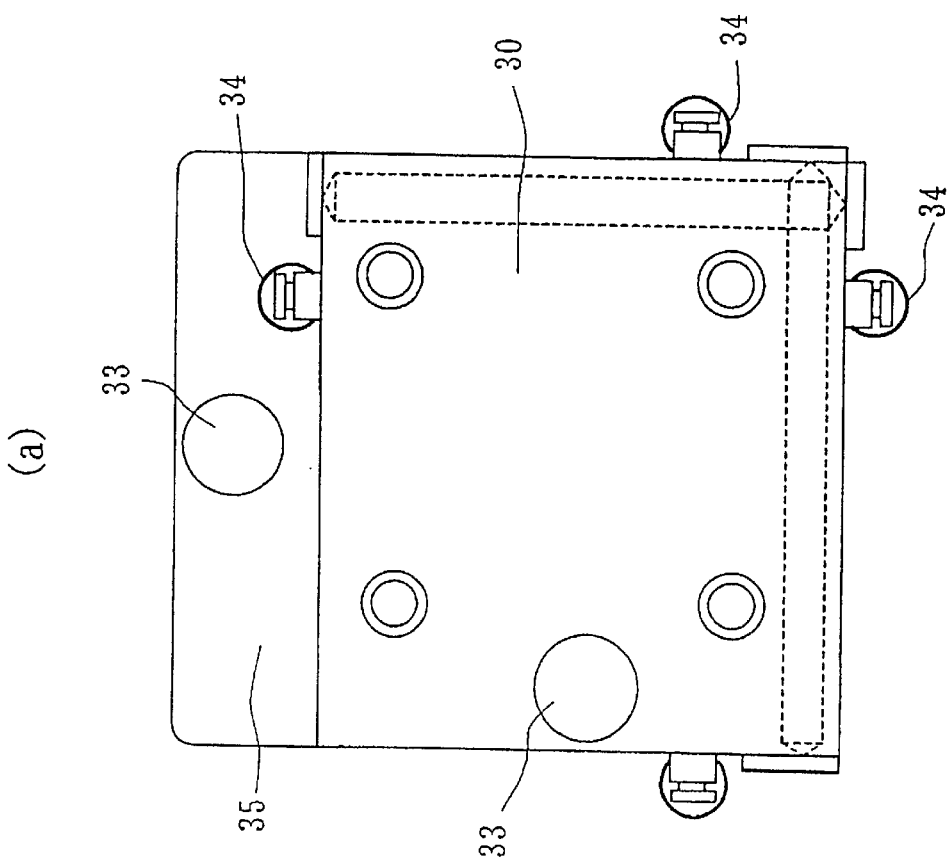

1 plate
3 screw hole
5 V-shaped concave plate
6 adjusting screw
7 male screw
8 middle plate
10 female screw
11 rotary ring
12 small ball
13 spring hook
14 central cylindrical portion
15 spring hook
16 spring
17 central hole
18 fixing screw
20 laterally elongated hole
21 projecting shaft
22 screw

What is claimed is:

1. A device for adjusting attitude and position of an optical element, comprising:

an upper plate having an optical element fixing part formed on an upper surface side of said upper plate and three V-grooves formed on a lower surface side of said upper plate at an equal angular pitch;

an adjusting screw mount plate having three female screw portions formed at the equal angular pitch on the upper surface side of said adjusting screw mount plate opposing the lower surface side of said upper plate and a spring engaging part formed in a central area of said adjusting screw mount plate;

three adjusting screws, each of the adjusting screws having a ball at a top thereof for abutting on a corresponding one of the V-grooves and a male screw portion to be threaded with a corresponding one of the female screw portions of said adjusting screw mount plate; and a spring to be extended between a spring hook formed on said upper plate in the central area and a second spring hook formed on said adjusting screw mount plate.

2. The device according to claim 1, wherein said adjusting screw mount plate is rotatably mounted on a fixed member.

* * * * *